(12) United States Patent
Hüther

(10) Patent No.: US 12,459,839 B2
(45) Date of Patent: Nov. 4, 2025

(54) DEVICE AND METHOD FOR TREATING A FLOW OF WATER

(71) Applicant: Fabio and Markus colloid engineering GmbH, Freienbach (CH)

(72) Inventor: Fabio Hüther, Ermatingen (CH)

(73) Assignee: Fabio and Markus colloid engineering GmbH, Freienbach (CH)

(*) Notice: Subject to any disclaimer, the term of this patent is extended or adjusted under 35 U.S.C. 154(b) by 496 days.

(21) Appl. No.: 17/909,470

(22) PCT Filed: Feb. 25, 2021

(86) PCT No.: PCT/EP2021/054680
§ 371 (c)(1),
(2) Date: Sep. 6, 2022

(87) PCT Pub. No.: WO2021/175694
PCT Pub. Date: Sep. 10, 2021

(65) Prior Publication Data
US 2023/0116087 A1  Apr. 13, 2023

(30) Foreign Application Priority Data

Mar. 6, 2020 (CH) .................................. 267/20
Sep. 29, 2020 (CH) .................................. 1233/20

(51) Int. Cl.
C02F 1/46 (2023.01)
C02F 1/48 (2023.01)
C02F 1/461 (2023.01)

(52) U.S. Cl.
CPC ............ *C02F 1/4606* (2013.01); *C02F 1/482* (2013.01); *C02F 2001/46133* (2013.01); *C02F 2201/005* (2013.01); *C02F 2201/4611* (2013.01); *C02F 2201/4613* (2013.01); *C02F 2201/4616* (2013.01); *C02F 2303/04* (2013.01)

(58) Field of Classification Search
CPC ...... C02F 1/46; C02F 1/32; C02F 1/30; C02F 1/42; C02F 1/36; C02F 1/72; C02F 1/48; B01J 13/00
See application file for complete search history.

(56) References Cited

U.S. PATENT DOCUMENTS

| | | | |
|---|---|---|---|
| 6,350,385 B1* | 2/2002 | Holt | C02F 1/46104 210/764 |
| 7,374,655 B2* | 5/2008 | Roberts | C02F 1/48 204/267 |
| 2004/0251211 A1 | 12/2004 | Suddath | |
| 2009/0229981 A1* | 9/2009 | DeSanto | C02F 1/46109 204/554 |

FOREIGN PATENT DOCUMENTS

| | | |
|---|---|---|
| DE | 19519715 | 12/1996 |
| DE | 10009643 | 9/2001 |
| EP | 0114364 | 8/1984 |

* cited by examiner

*Primary Examiner* — Clare M Perrin
(74) *Attorney, Agent, or Firm* — Volpe Koenig

(57) ABSTRACT

A device for treating a flow of water having a chamber (1) through which the flow of water passes. In the chamber (1), a voltage with alternating polarity is fed to two electrodes (15a, 15b) of at least one electrolysis device, whereby particles of the electrode material are released to and entrained by the flow of water. The particles in the flow of water are mixed in at least one nozzle (45) of a vortexing device.

10 Claims, 3 Drawing Sheets

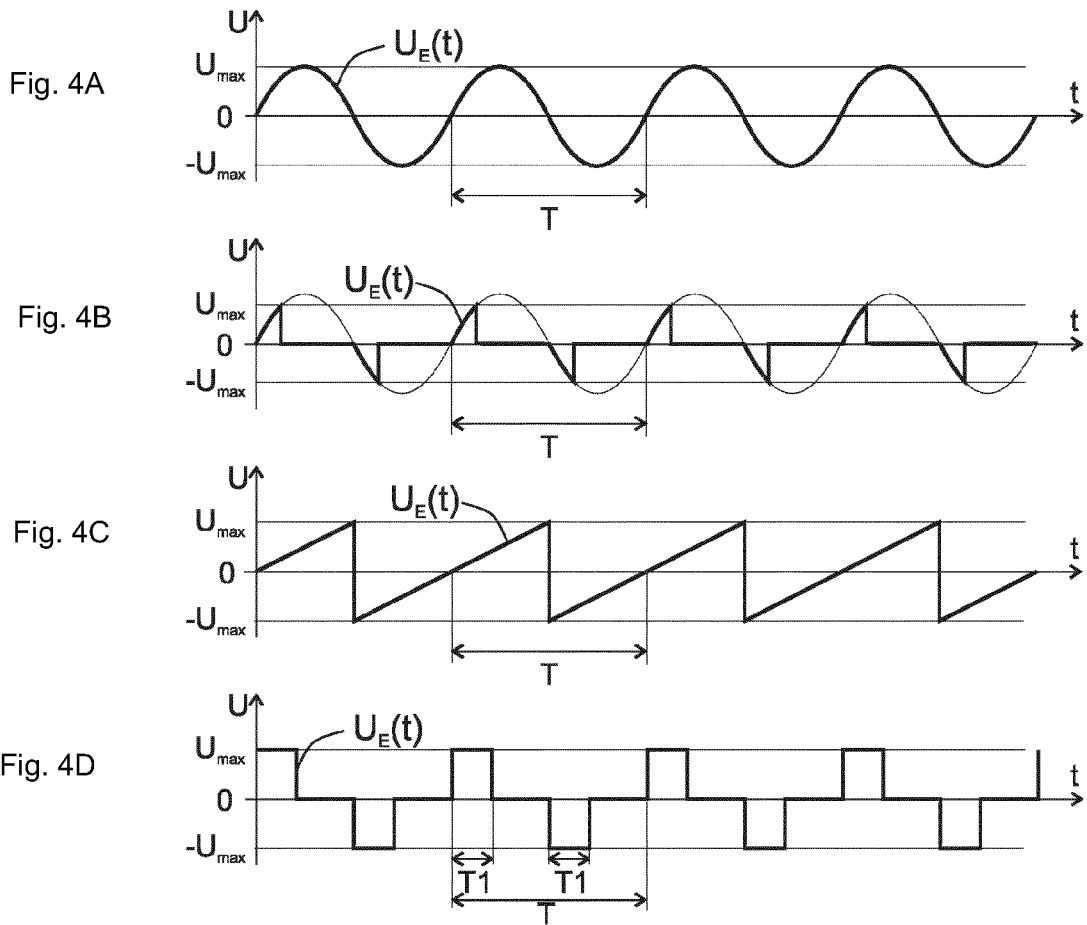
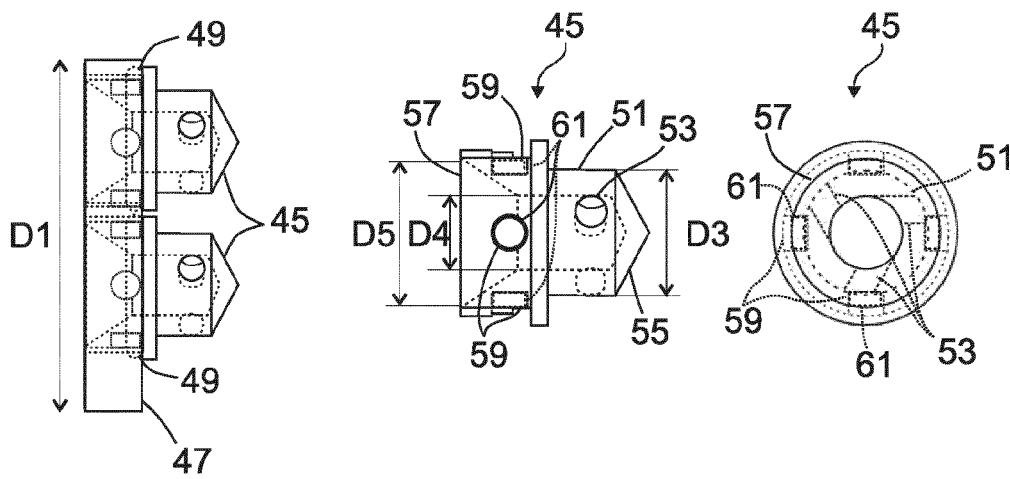
FIG.5　　　　　FIG.6　　　　　FIG.7

DEVICE AND METHOD FOR TREATING A FLOW OF WATER

TECHNICAL FIELD

The invention relates to the technical field of water treatment. The invention provides an apparatus and a method of treating a stream of water.

BACKGROUND

In the production of drinking water, it has to be ensured that this does not contain any pathogenic germs, and that the salt content is less than 0.1%.

For treatment of water, it is possible to use different methods according to the respective demands. Examples of such methods are:
  a) Filtration, especially micro-, ultra- and nanofiltration. Filtration can remove particles from the water that are larger than the pore size of the respective filter. In the production of drinking water, it is possible to separate out pathogenic germs as well by ultrafiltration.
  b) Reverse osmosis for removal of salts.
  c) Disinfection, especially by addition of chlorine, chlorine dioxide, sodium hyperchlorite or ozone or by UV irradiation for reduction of infectious germs.

In what is called dead-end filtration, the stream of water (feed) to be cleaned is pushed against a filter membrane or membrane under pressure. Particles larger than the pores of the membrane are retained here by the membrane as retentate. On the other side of the membrane, the cleaned water, or the permeate in general, flows away. The retentate collects on the inflow side. Therefore, filters have to be exchanged or cleaned at regular intervals. Sustained continuous operation of such systems is impossible.

In tangential flow filtration, also called crossflow filtration, the stream of water (feed) to be cleaned flows tangentially under pressure along one surface of the membrane. On the other, opposite surface of the membrane, a portion of the stream of water emerges as cleaned permeate. The remaining portion of the stream of water supplied is led off as retentate having a higher particle concentration. Filtration by the tangential flow principle can be continuous since the retained particles are constantly removed with the retentate stream. However, the efficiency of this process is limited since a non-negligible proportion of the stream of water (feed) supplied is removed again as retentate and hence cannot be utilized as cleaned permeate.

For prevention of germ recontamination of drinking water in distribution networks, chlorine may be added to this drinking water, for example by suitable chlorination methods. The chemical contamination of the water by chlorine is only permissible within approved limits. Chlorinated water is smelly and is not neutral in terms of taste.

EP0114364A1 discloses a system for sterilization of water. Filtered water flows here through a flow meter and through an oxidation chamber having electrodes. Depending in each case on the composition or the impurities in the water, active oxygen, chlorine and/or other oxidizing substances are produced here. Subsequently, the water flows through a chamber having silver electrodes. An electronic controller controls the electrolytic current between the electrodes depending on the stream of water such that silver ions are produced directly proportionally to the flow of water. In a further chamber with silver-activated carbon, microbes are then destroyed in an oligodynamic process and filtered out together with excess silver particles.

The system described in EP0114364A1 is comparatively complex. Microbes and silver particles are retained in the filter chamber with activated carbon. The oligodynamic process, i.e. the destruction of the microbes, takes place essentially in the filter chamber. The activated carbon, or the filter of the filter chamber, must be replaced or regenerated regularly. If the cleaned water is being fed into a distribution grid, it has to be ensured that no recontamination can take place.

SUMMARY

It is an object of the present invention to provide an apparatus and a method for improved treatment of drinking water.

This object is achieved by an apparatus and by a method for treatment of a stream of water having one or more of the features disclosed herein.

The apparatus comprises a chamber having an inflow opening and having an outflow opening that can be respectively connected to a supplying and draining pipe section of a water pipe. Water flowing in the water pipe flows through the inlet opening into the chamber, the wall of which defines a flow channel, and out again through the outlet opening. The chamber comprises at least one electrolysis device having two spaced-apart electrodes and a vortexing device.

Each electrolysis device is intended to electrochemically release particles of the electrode material to the water flowing through the chamber. The electrodes are in direct contact with the water flowing through the chamber.

The electrodes of each electrolysis device may be manufactured from the same material or from different materials, for example from metals such as silver or copper or from alloys with these metals. The electrodes may take the form, for example, of mutually spaced-apart plates, with the interspace between the plates bounding a flow space for the stream of water. In the case of arrangements with multiple electrolysis devices, these electrolysis devices may be arranged in series and/or in parallel in flow direction of the water. In one possible configuration, two electrolysis devices are arranged in series, with one of these electrolysis devices comprising two electrodes made of copper or a copper alloy, and the other electrolysis device electrodes made of silver or a silver alloy. Modules having identical or different electrodes may be easily combined with one another according to the particular demands at a site of use.

In a further possible configuration, for example, electrode plates of two electrolysis devices may be arranged parallel to one another. In particular, these electrolysis devices may comprise a common middle plate, the mass or thickness of which is preferably greater than that of the two outer plates. The electrodes may all be manufactured from the same material or from different materials. Arrangements having multiple plates arranged parallel to one another take up a small amount of space and are particularly efficient. The effective electrode area is large relative to the volume taken up. Due to the comparatively small distance between the electrodes, operation with lower voltages is possible.

Due to the strong antimicrobial action, preference is given to using silver and/or copper as electrode material for killing of germs. Silver has a particularly high antimicrobial spectrum of action. Ultrasmall silver particles, also called nanosilver, can penetrate cell walls and cell membranes and act within cells. Ultrasmall silver particles can also stick to viruses and suppress the binding thereof to host cells. Additionally or alternatively, electrodes may also be manufactured from other metals, for example from tin, iron, bismuth or gold. Oligodynamic action is also possessed by lead and mercury. Taking account of various factors such as toxicity, efficacy, availability and costs, for example, silver in particular, but also copper, are preferred electrode materials in the treatment of drinking water.

Alternatively or additionally, electrodes made of other materials may be used to enrich the stream of water with other substances, for example to mineralize with trace elements such as calcium and/or magnesium. It is thus possible to provide the respectively desired water quality in different applications, for example desalination plants, water treatment plants in swimming baths or therapeutic baths and facilities for processing of drinking water or of water for agricultural applications.

In each electrolysis device, an electrical voltage supplied by a corresponding voltage source is applied to the pair of electrodes. This creates an electrolytic current between the respective electrodes in water. Among the processes that occur here are release of positively charged cations at the anode and of positively charged and/or neutral particles of the electrode material to the water. The positively charged ions and particles in the water are attracted by the negatively charged cathode via coulombic force. The speed component in the direction of the cathode is dependent on the voltage between the electrodes and on the type of charged particles. Charged and uncharged particles are additionally entrained by the stream of water.

The voltage source preferably provides a voltage with alternating polarity, for example an AC voltage of less than 50 V AC with a frequency in the range from about 50 to 60 Hz. The alternating polarity causes each of the electrodes to act alternately as anode and cathode. This prevents or minimizes deposits on the electrodes through reduction or oxidation.

At least in some of the ions or charged particles released by an electrode, the charge is neutralized again due to the alternating polarity of the electrodes. Redeposition of these moieties on the electrode is additionally prevented or at least made more difficult by the flow of water.

Various parameters affect the release of particles and ions from the respective anode to the stream of water. By suitable choice and/or changes in values of such parameters, it is possible to influence properties such as the type and amount of ions and particles released per unit time, for example.

The polarity of the voltage applied to the electrodes in each case determines the direction of the electrolysis current. A higher voltage between the electrodes and/or a smaller distance between the electrodes result in a higher electrolysis current. The wave shape or generally the change in electrode voltage over time likewise affect the release of ions and particles from the electrodes. In particular, by defining a voltage function, i.e. an electrode voltage as a function of time, it is possible to influence the average size or size spectrum and/or the charges of released particles. For example, in the case of silver or copper electrodes, the application of a voltage can result in release not only of individual silver cations (Ag+) or copper cations (Cu++) to the water. Depending on the forces acting in each case, it is also possible for electrically uncharged and/or charged nanoparticles comprising multiple silver or copper atoms or compounds with silver or copper atoms to be torn out of the electrode acting as anode in each case. Typically, the size of such particles is in the order of magnitude of about 1 nm to about 100 nm. The number of atoms in such particles is in the order of magnitude of about 1000 to about 10E9. Liquid dispersions comprising such particles are also referred to as colloidal silver or copper.

The frequency of the change in polarity of the electrode voltage and the size and charge of particles released affect the average distance that these particles cover transverse to the stream of water in the direction of the electrode having complementary charge.

Geometric parameters such as sizes and separation of effective electrode surfaces that are in contact with the water and the free flow cross section bounded by these electrode areas likewise affect the release of ions and particles to the stream of water. In the case of electrodes in plate form, it is possible, for example, by means of a smaller plate separation to increase the electrical field strength between the plates and to reduce the flow cross section for the water with otherwise identical dimensions. The greater electrical field results in a greater force on charged particles that have been released to the stream of water in the direction of the respective complementary electrode, and the greater flow rate of the water results in a greater force in flow direction of the water.

For a defined electrode separation, the distance covered by charged particles in the direction of the electrode with complementary charge can be reduced by increasing the frequency of the changing polarity and/or reducing the electrode voltage. After the change in polarity, charged particles migrate back in the direction of the electrode by which they have been released to the water. In the case of those particles that get sufficiently close to this electrode again, the charge is released back to the electrode. Since the particles are still being entrained by the stream of water, they cannot add onto the electrode again.

Adjoining the electrodes, the stream of water now comprises colloidal silver or copper. Alternatively or additionally, it would also be possible to release other materials electrochemically to the stream of water.

The fluidizing device comprises one or more nozzles that affect the flow of water and especially bring about mixing of the colloids in the stream of water. Preferably, each nozzle comprises at least one entry channel that opens preferably tangentially into a vortex space transverse to the main flow direction. It is possible to locally increase the flow rate of the stream of water through bottlenecks in the region of the entry channels. The vortex space preferably has a rotationally symmetric cross section. When the stream of water is introduced tangentially into the vortex space through the entry channels at high flow rate, vortexing results in formation of turbulent flows. Speeds of rotation of more than 1000 $min^{-1}$ to more than 100 000 $min^{-1}$ are generally achieved here. This results in degassing of the water. Due to the forces and pressure conditions that are active during vortexing, it is especially possible to discharge dissolved carbon dioxide $CO_2$ bound as carbonic acid as gas. The vortexing of the water allows the structure of dissolved calcium compounds to be altered directly and/or indirectly due to the altered carbonic acid content. This effect can be utilized even without electrolysis devices to prevent scale deposits, make them more difficult or even to gradually dissolve them.

The vortexing of the water, moreover, increases the probability of interactions of particles in the stream of water. In particular, larger particles can be broken into smaller particles, for example in the event of collisions.

There are preferably one or more permanent magnets disposed, for example, in the region of each nozzle such that the stream of water passes through the magnetic field resulting from these magnets during or after passage through the nozzles. Charged particles and ions are additionally deflected or accelerated in different directions due to the Lorentz forces that act as they pass through the magnetic field. In the case of polar particles, the magnetic field creates torques, and in the case of electrically conductive particles, a voltage is induced, which in turn results in a torque acting on the particles as these particles move through the magnetic field.

Due to the interaction of the magnetic field with charged, polar and electrically conductive particles, there is an influence on the kinetic speed and energy distribution of these particles. Larger particles are broken up into smaller particles, for example as a result of collisions. The breakup of larger silver and copper particles into smaller particles increases the number of these particles. Since smaller particles likewise have an antimicrobial effect, the increasing concentration of the colloidal particles increases the effectiveness thereof for the same mass.

The vortexing of the water and the influence of the magnetic field thereon also affect substances such as calcium carbonate and magnesium carbonate, for example, or generally chemical compounds that can group into crystal structures, especially salts with ionic bonds. The formation of crystal nuclei and crystals is prevented or at least made more difficult, for example, by molecular vibrations or due to the momentum and angular momentum or the movement of particles. Crystal nuclei that already have a certain size can be broken into smaller particles, for example, by collisions with other particles, especially by collisions with colloidal particles. This effect is advantageous in the provision of drinking water and in the provision of water in agriculture.

BRIEF DESCRIPTION OF THE DRAWINGS

The invention is described in detail hereinafter by figures. The figures show:

FIG. 4a) a sine function of the voltage signal as a function of time,

FIG. 4b) a sine function with phase cutting of the voltage signal as a function of time, FIG. 4c) a sawtooth function of the voltage signal as a function of time, FIG. 4d) a voltage signal with rectangular pulses as a function of time, FIG. 5 an enlarged side view of the vortexing device from FIG. 1, FIG. 6 a nozzle of the vortexing device in side view, FIG. 7 an axial view on the outflow side of the nozzle from FIG. 6, FIG. 8 a longitudinal section of a further apparatus for treatment of a stream of water, FIG. 9 a first chamber section of the apparatus from FIG. 8, FIG. 10 a holder with electrodes in the apparatus from FIG. 8, and FIG. 11 an adapter with sensor elements.

DETAILED DESCRIPTION

Figure 1:
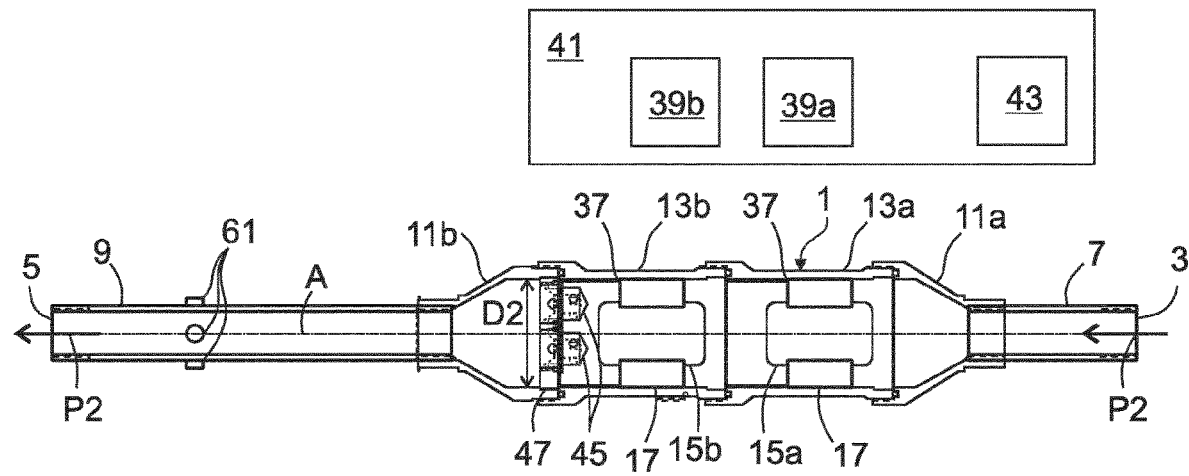
FIG. 1 a longitudinal section of an apparatus for treatment of a stream of water, FIG. 2 a cross section of a chamber section with an electrode arrangement, FIG. 3 a side view of the electrode arrangement from FIG. 2, FIG. 4 four different voltage functions for actuation of the electrodes, described as follows.

FIG. 1 shows a longitudinal section of an illustrative embodiment of an apparatus for treatment of a stream of water. The apparatus comprises a chamber 1 having an inlet opening 3 and an outlet opening 5, which can be connected by a supplying or a draining pipe section of a water pipe. The chamber 1 is preferably composed of multiple sections that are suitably connected to one another in a leakproof and pressure-resistant manner, for example by means of fittings and/or inner and outer threads. Connection sites between adjacent sections may, if required, comprise additional sealing means, for example O-rings. The individual sections of the chamber wall may especially be in an essentially rotationally symmetric design with cylindrical and/or conical regions and may be in a coaxial arrangement along a common chamber axis A. By virtue of this modular construction, it is possible to assemble different chambers 1 in a simple manner in accordance with the respective needs. The walls of the chamber sections bound a flow space or flow channel for the water. Preferably, the inlet opening 3 is formed at the end of an inlet tube 7 and the outlet opening 5 at the end of an outlet tube 9, which can be connected to the respective pipe section of the water pipe by suitable known connection techniques. The main flow direction of the water is shown by the arrows P1.

The chamber 1 comprises, adjoining the inlet tube 7, preferably a first adapter 11a, which may comprise, for example, a conical section for extending or enlarging or generally for adjusting the area of the flow cross section. At either end, the adapter 11a preferably comprises an internal thread as connecting means for connecting to corresponding connecting means on the inlet tube 7 and on an adjoining chamber section 13a. A further chamber section 13b, a further adapter 11b and the outlet tube 9 are connected to one another in an analogous manner.

In the first chamber section 13a are disposed two electrodes 15a of a first electrolysis device. These are manufactured from a first material, for example from fine silver or fine copper. The electrodes 15a are preferably bodies having at least approximately flat contact surfaces, for example plates or bars. The electrodes 15a are kept spaced apart from one another in the chamber section 13a in such a way that they bound a section of the flow channel.

Figure 2:
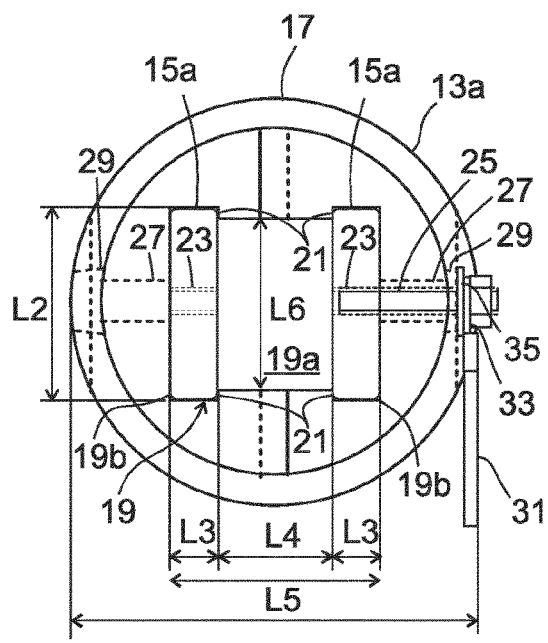
Figure 3:
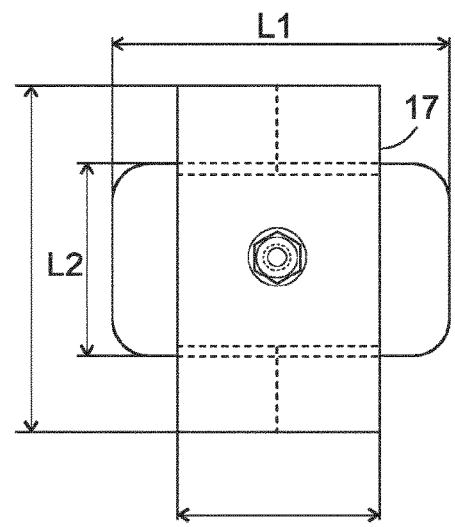

FIG. 2 shows a cross section of the chamber section 13a with the electrode arrangement, FIG. 3 an enlarged detail view of the electrode arrangement. In the case of apparatuses intended for installation in ¾-inch water pipes, the approximately cuboidal electrodes 15a may have, for example, a length L1=49.7 mm, a width L2=28.5 mm and a height L3=7 mm. The two electrodes 15a in this embodiment are secured at a distance L4 of about 17 mm from one another in a ring-shaped holder 17. The holder 17 is manufactured from a food-compatible material, for example from a polyamide. It may have a one-piece or alternatively multipart composition, for example composed of two halves of a ring. In the case of multipart embodiments, the parts may be joined to one another by suitable joining techniques, for example ultrasound welding or by means of snapfit elements. The holder 17 comprises a central axial opening 19 with a middle section 19a of rectangular cross section and two outer rectangular sections 19b adjoining the latter. The total length L5 of these sections 19a, 19b corresponds to the sum total of the two electrode heights L3 and the mutual separation L4 between the two electrodes 15a. The length and width of each of the outer sections 19b corresponds essentially to the width L2 and the height L3 of the electrodes 15a.

It is optionally additionally possible for a sealing plate or an elastic sealing element (not shown) to be disposed between the electrodes 15a and the adjoining faces of the holder 17. This may possibly increase the total length L5 of the central opening 19.

In the region of the outer sections 19b, the width of the opening 19 corresponds to the width L2 of the electrodes 15a. The opening 19 preferably has a slightly smaller width L6 in the middle section 19a. By means of offsets 21 at the boundaries of the outer sections 19b to the middle section 19a of the opening 19, it is possible to keep the electrodes 15a mounted in the outer sections 19b parallel to one another in separation L4.

Each electrode 15a comprises a threaded hole 23. This is preferably disposed in a blind hole accessible only from one of the two main sites. Alternatively, the threaded hole 23 may also be continuous.

By means of two screws 25 or threaded bolts that are inserted through corresponding holes 27, 29 in the holder 17 and in the chamber section 13a and screwed into the threaded holes 23, the electrode arrangement is fixedly connected to the wall of the chamber section 13a. Each electrode 15a is pressed here by the holding force of the respective screw 25 onto the holder 17 or onto any sealing element disposed between the holder 17 and the electrode 15a. The screws 25 are preferably manufactured from stainless steel. The interspace between the holes 27, 29 is sealed in a watertight manner, for example with an epoxy resin or a silicone sealant. Alternatively, the seal can also be effected by means of a compression fit with an elastic sealing element, for example a rubber ring.

Electrical connection wires 31 for the electrodes 15a are connected in an electrically conductive manner, for example by means of terminals 33, to the screws 25 or threaded bolts. The walls of the chamber sections 13a are preferably flattened out on the outside in the region of the holes 29. An electrically insulating plate 35 has the effect that the terminals 33 are in electrical contact solely with the respective screws 25, but not with the wall of the chamber section 13a.

The holder 17 tightly adjoins the inside of the wall of the chamber section 13a. The wall of the chamber section 13a preferably comprises an offset 37 on the inside (FIG. 1). In particular, the internal diameter of the chamber section 13a may be slightly greater in an inflow-side section, i.e. about 0.5 to 1 mm greater, for example, than in the section downstream. The holder 17 with the electrodes 15a may be inserted into the chamber section 13a on the inflow side up to the offset 37. The offset 37 serves as a stop for the holder 17 and keeps it in the desired position. This facilitates the securing of the holder 17 on the wall of the chamber section 13a.

Additionally or alternatively, the holder 17 may be sealed with a sealing means with respect to the wall of the chamber section 13a. In particular, the holder 17 may comprise fins around its periphery that act as a labyrinth seal (not shown).

The electrodes 15a and the holder 17 together form a bottleneck or constriction in the flow channel within the chamber section 13a. In the embodiment described, the free flow cross section is in the order of magnitude of about 0.5 to 1.5 times the flow cross section of the inlet tube 7. The average flow rate of the water in the region of the electrodes 15a is in a similar order of magnitude to that in the inlet tube 7.

In alternative embodiments of the apparatus, the flow rate of the water in the region of the electrodes 15a may be increased or reduced by, for example, reducing or increasing the distance L4 between the electrodes 15a. In the case of a smaller electrode separation L4 by a factor of 10, for example, the average flow rate of the water is increased by this factor, which additionally makes it difficult for particles to be deposited on the electrodes 15a. A smaller electrode distance L4 with the same electrode voltage also results in an increase in the electrical field between the electrodes 15a. Higher electrical fields result in higher forces transverse to the main flow direction P1 on charged ions and particles between the electrodes 15a.

In further alternative embodiments, each electrolysis device may comprise multiple electrode pairs. The shape, size, arrangement and mounting of electrodes 15a, 15b in a chamber section 13a, 13b may be matched appropriately to the respective demands in every apparatus. In particular, values specified for ¾-inch water pipes may be adjusted by scaling for water pipes having different diameters.

A voltage source 39a is connected to the electrodes 15a via connection wires 31. The voltage source 39a may provide a voltage with polarity that alternates periodically or generally according to a defined pattern. The polarity can especially change with a frequency of 50 Hz or 60 Hz from a supply grid. In simple embodiments of the apparatus, the electrodes 15a may be operated directly with grid voltage transformed to a permissible value of, for example, 48 V AC. The current can optionally be limited, for example, by means of an ohmic resistance connected in series in the circuit, where this resistance is preferably adjustable in a continuous or stepwise manner, for example within a range from 1 kOhm to 10 kOhm.

Preferably, the electrolysis current can be controlled or regulated as a function of the flow of water. In the case of simple embodiments of the apparatus, it is possible to use a flowmeter for this purpose. This comprises a switch which is closed only when the volume flow rate of the water exceeds a defined minimum value. The switch may be disposed, for example, on the primary or secondary side of a transformer for the voltage source 39a.

In further embodiments, the apparatus may comprise an electronic controller 41 that enables refined control or regulation of the electrode voltage UE and/or of the electrolysis current.

The controller 41 here may comprise, for example, a sensor arrangement 43 which, in addition or as an alternative to the flowmeter, has one or more sensors for detecting one or more of the following measurement parameters:
flow rate of the water,
water temperature,
water hardness, especially proportion of Ca and/or Mg ions,
level of contamination. This can, for example, be detected directly by sensors or alternatively defined as an adjustable specification value, for example by means of a selector switch,
electrode current, or
electrode voltage.

The controller 41 preferably comprises a microcontroller that detects the measurement parameters and processes them according to defined or programmed methods to give control factors for an actuator or a driver with which the electrode voltage UE and/or the electrode current are influenced. An actuator used may especially be an arrangement comprising one or more field-effect transistors FET.

The controller 41 may be designed, for example, to provide a voltage signal $U_E(t)$ with periodically alternating polarity and in so doing to control the peak values Umax and −Umax, and/or the pulse duty factor, i.e. the ratio of pulse duration T1 to period duration T as a function of the volume flow rate of the water.

FIG. 4 shows, by way of example, four possible functions for the voltage signal or the electrode voltage $U_E$ as a function of time t, namely a) a sine function, b) a sine function with phase cutting, c) a sawtooth function and d) a signal with rectangular pulses.

For all functions, the values of the positive and negative peak voltage values Umax and −Umax may be defined in a fixed manner. Alternatively, the controller 41 can alter or adjust the peak voltage values Umax and −Umax, for example, depending on the conductivity of the water and/or the respective electrode separation L4.

The period T or frequency f=1/T of the AC voltage U(t) may likewise be defined in a fixed or variable manner by the controller 41, for example as a function of the electrode separation L4 and/or the peak voltage values Umax and −Umax.

By superimposing an AC voltage signal on a DC voltage or on a further AC voltage having a comparatively low frequency of, for example, 0.01 Hz to about 10 Hz, it is possible to control, especially to increase, the proportion of charged particles that are entrained by the stream of water if required.

As shown in FIG. 1, the apparatus may comprise one or more further chamber sections 13b each having a further electrolysis device. The construction is essentially the same as for the first chamber section 13a, except that the electrodes 15b of the electrolysis device in the further chamber section 13b are generally manufactured from a different material, for example from fine copper when the electrodes 15a in the first chamber section 13a are manufactured from fine silver, or vice versa.

Analogously to the electrodes 15a in the first chamber section 13a, the controller 41 also controls the preferably electrically isolated actuation of the electrodes 15b in the further chamber section 13b by means of a further actuator. The parameters for actuation of the further electrodes 15b may preferably be fixed individually, independently of those of the first electrolysis device. In this way, it is possible to individually control the amount of electrode material released electrochemically to the stream of water per unit time for each electrode pair. If the electrodes 15b of the second electrolysis device are actuated with an AC voltage of the same frequency as the electrodes 15a of the first electrolysis device, the relative phase position of these AC voltage signals is preferably offset by a defined value of, for example, a half wavelength.

In further alternative embodiments, it is possible for one or more electrolysis devices to comprise more than two electrodes and/or electrodes made from different materials.

In addition to the electrolysis device(s), a vortexing device is disposed in the chamber 1, which vortexes the stream of water. Turbulence here brings about better mixing and distribution of the particles released from the electrodes 15a, 15b.

In the embodiment of the apparatus shown in FIG. 1, the vortexing device is arranged downstream of and immediately adjoining the electrolysis devices. It comprises one or more nozzles 45 that deflect and/or locally accelerate at least a portion of the stream of water transverse to the main flow direction P1. In the case of vortexing devices having multiple nozzles 45, these may be arranged in parallel and/or in series.

FIG. 5 shows an enlargement of the vortexing device from FIG. 1. Of a total of three nozzles 45 screwed into threaded holes on a nozzle carrier 47 in the form of a cylindrical plate, two are visible. Each of the nozzles 45 is sealed against the nozzle carrier 47 by an O-ring 49 as sealing element. The outer diameter D1 of the nozzle carrier 47 is preferably matched to the greater inner diameter D2 of the second adapter 11b on the inflow side, such that it can be bonded to the second adapter 11b by insertion into the opening thereof on the inflow side. Alternatively, it would be possible for the parts, for example, also to comprise threads for screw connection. The nozzle carrier 47, the wall of the chamber 1, and the inlet tube 7 and the outlet tube 9 may be manufactured, for example, from non-magnetic machining steel 1.4404 or V4A.

In the case of apparatuses intended for installation in ¾-inch water pipes, D1 and D2 may, for example, be in the range from about 40 mm to about 60 mm and especially about 53 mm, and the nozzles 45 preferably have a ½-inch outer thread for screwing into corresponding threaded holes in the nozzle carrier 47.

In ¾-inch water pipes that are in widespread use in service engineering, the volume flow rates of the water are typically in the order of magnitude of about 1 liter per minute to about 50 liters per minute. For other applications, especially for those with greater volume flow rates of up to about 150 liters per minute or up to 1000 liters per minute, it is possible to correspondingly scale diameters of pipes and dimensions of the apparatus in a suitable manner.

FIG. 6 shows a single nozzle 45 from FIG. 5 in side view, FIG. 7 from the side of the outlet tube 9 with viewing direction counter to main flow direction P1.

The nozzle 45 comprises, in an inflow section, a cylinder shell 51 that bounds a vortex space. The inflow end of the cylinder shell 51 is closed by an inflow cap 55 having the shape, for example, of a conical shell. The cylinder shell 51 comprises at least one, preferably three, inlet hole(s) 53 that preferably open(s) tangentially into the vortex space transverse to the main flow direction P1. In a section of the inflow side, the vortex space has a minimal internal diameter D4. In a funnel-like section on the outflow side, the free flow cross section opens out to an exit opening 57 up to a maximum internal diameter D5. In the nozzle 45, the stream of water is divided into substreams that are deflected by the inlet holes 53 and introduced into the vortex space tangentially from various directions in an accelerated manner. The substreams are combined again in the vortex space. As shown in FIG. 7, the inlet holes 53 may open into the vortex space with the same sense of rotation. This maximizes the average rotation component of the stream of water exiting from the nozzle 45 at the exit opening 57.

In the outflow section, the wall of the nozzle 45 comprises at least one, preferably four, blind hole-like opening(s) 59 disposed on the outside in uniform distribution. In each of these openings 59 is disposed a permanent magnet 61, for example a cylindrical neodymium magnet, having a diameter, for example, of about 4 mm and a thickness of about 2 mm. The remanence of such a magnet 61 may, for example, be in the order of magnitude of 0.8 T to 1.5 T.

The nozzles 45 are preferably manufactured from an iron-containing alloy, for example from aluminum bronze, for example CuAl10Ni5Fe4. This has the effect that the magnets 61 are held in the openings 59 by magnetic attraction. This facilitates the insertion of the magnets 61 into the openings 59. The magnets 61 are all secured with the same polarity on the nozzle 45, i.e. either all south poles or all north poles of the magnets 61 are aligned radially inward or radially outward with respect to the nozzle axis.

Specified hereinafter are ranges of values and values for dimensions that are suitable in the case of an apparatus intended for installation in ¾-inch water pipes.

External diameter D3 of the cylinder shell 51: about 12 mm to about 18 mm; wall thickness of the cylinder shell: about 2.5 mm to about 3.5 mm or internal diameter D4 of the cylinder shell 51: about 5 mm to about 13 mm; diameter of the inlet holes 53: about 2 mm to about 5 mm, especially 3 mm to 3.5 mm, e.g. 3.3 mm; the maximum external diameter D5 of the exit opening 57 is, for example, about 1 mm to about 3 mm less than the external diameter of the nozzle 45 in the exit opening 57. The magnets 61 are preferably cylindrical with a height of about 2 mm and a diameter of about 4 mm.

Such vortexing devices may especially be used in combination with one or two electrolysis devices, the electrodes 15a, 15b of which are actuated with an AC voltage, the effective value of which is less than 48 V, and the frequency of which is, for example, in the range from 10 Hz to 10 kHz.

For further applications, for example processing of saltwater or otherwise contaminated water to give useful water for plants, the apparatus may be suitably adapted, for example, by altering geometric dimensions, shapes, materials and/or electrical and/or magnetic parameters.

If required, the apparatus may, for example, be additionally supplemented by one or more upstream or downstream filters. It is optionally possible for further permanent magnets 61 to be disposed in the chamber 1, for example on the outside of the outlet tube 9. The chamber 1 is preferably ensheathed by a protective housing from which only the ends of the inlet tube 7 and of the outlet tube 9 protrude (not shown). The protective housing is electrically conductive and may, for example, be electrically connected to ground potential. The protective housing may comprise, for example, two or more, especially five, side walls, none of which is arranged parallel to any other. These side walls are preferably manufactured in a coherent manner as an extruded profile from aluminum. The electronic controller 41 may be disposed, for example, fully or partly in or on this housing. There are preferably one or more operating elements, for example a membrane keyboard with one or more operation keys and optionally a display device, disposed on the outside of this housing.

At least one of the operating elements enables switching-on and -off and/or the choosing of one of several possible defined modes of operation that differ, for example, by different maximum electrode currents.

Figure 8:
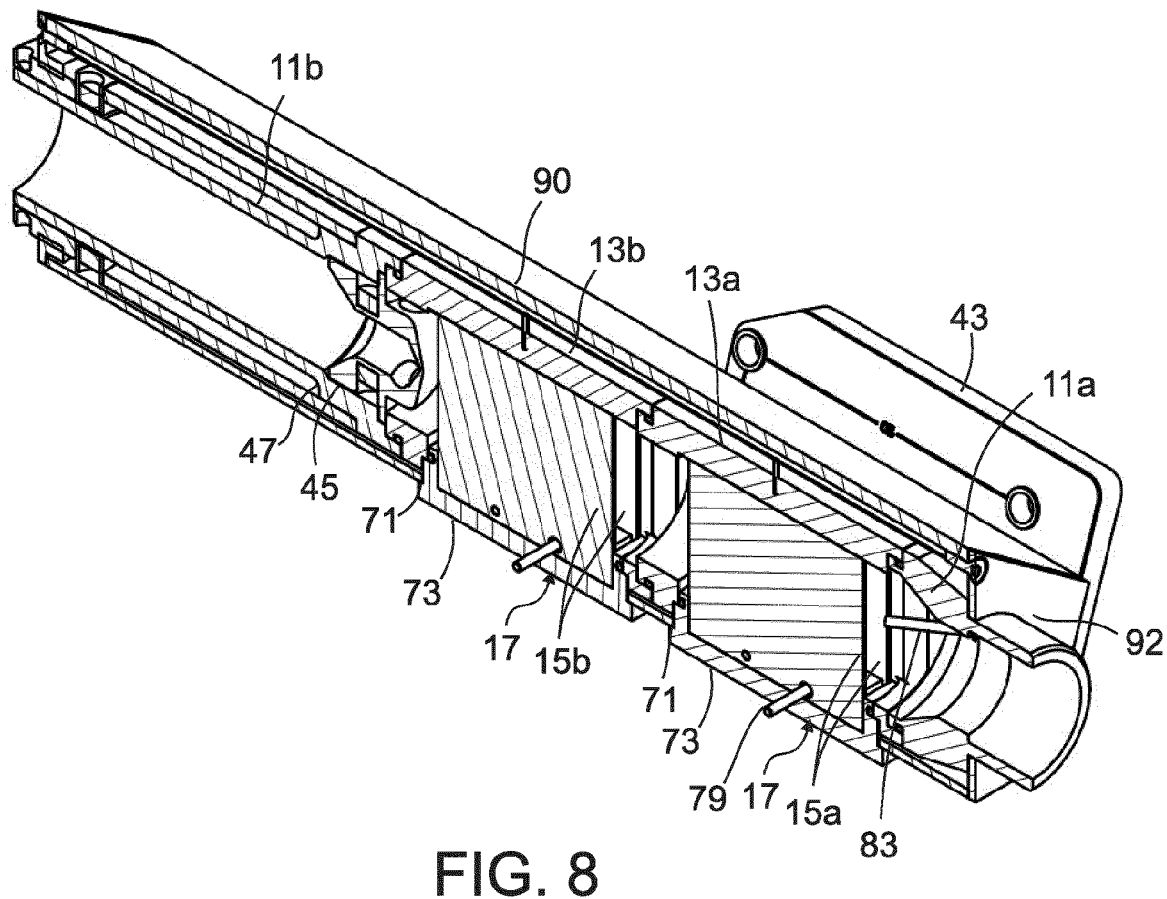
Figures 9, 10, 11:
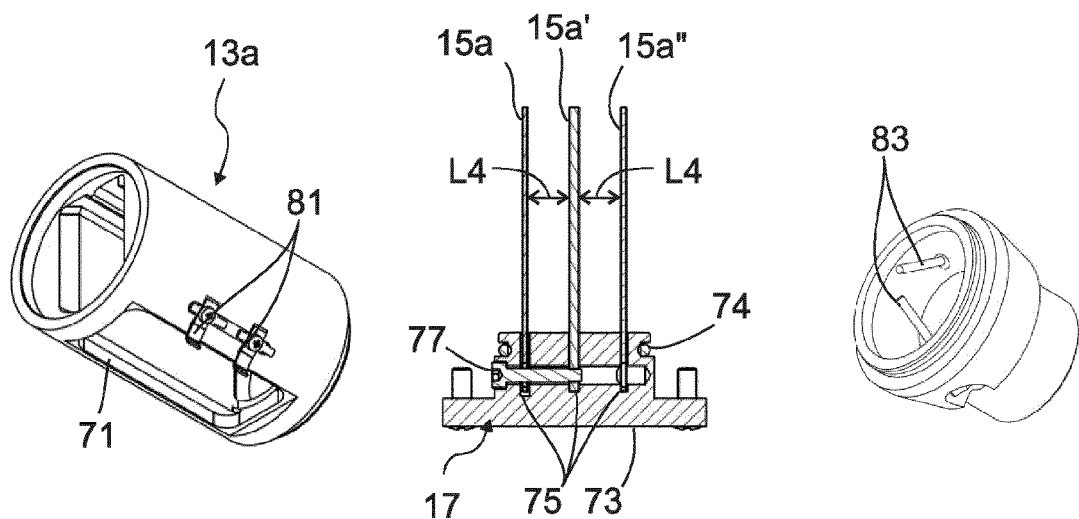

FIG. 8 shows a perspective view of a longitudinal section of a further apparatus. It differs from that in FIG. 1 especially in that the wall of each of the chamber sections 13a, 13b has an insertion opening 71, in that each holder 17 comprises a cover plate 73 and a sealing element 74 by which the respective insertion opening 71 can be sealed tightly, and in that three electrodes 15a and 15b in plate form project parallel to one another on each holder 17. FIG. 9 shows the chamber section 13a, FIG. 10 a cross section of the holder 17 with the three electrodes 15a, 15a', 15a". The thickness of the middle electrode 15a' is preferably in the order of magnitude of about 1 mm to about 6 mm and may especially be about 2 mm or about 4 mm. It is preferably about twice as large as that of the outer electrodes 15a, 15a". The distances L4 between every two adjacent electrodes 15a, 15a' and 15a', 15a" are essentially the same. The electrodes 15a, 15a', 15a" are secured in a force-fitting and/or form-fitting manner in receiving grooves 75 on the holder 17. A first contact screw 77 is connected in an electrically conductive manner to the middle electrode 15a' through a lateral hole in the holder 17 and through a corresponding hole in the outer electrode 15a. In an analogous manner, a second contact screw 79 is connected in an electrically conductive manner to the two outer electrodes 15a, 15a" through a further lateral hole in the holder 17 and through a corresponding hole in the middle electrode 15a'. If the holder 17 is connected to the first chamber section 13a, for example by screw connection or another suitable securing technique, the contact screws 77, 79 are connected in an electrically conductive manner to contact tabs 81 on the outside of the wall of the chamber section 13a. These contact tabs may be connected to the controller 43 via connecting wires. The wall of each chamber section 13a, 13b is preferably manufactured from an electrically insulating plastic, for example from POM-C. This is also true of further parts, especially the adapters 11a, 11b and the carriers 17.

As apparent from FIG. 11, the adapter 11a on the inflow side comprises two screws or pins 83 that project from the outside into the flow space, are sealed against the wall of the adapter 11a and are optionally electrically insulated. These are designed as sensor elements or as carriers of sensor elements with which the controller can detect measurement parameters, for example the flow rate and/or conductivity of water flowing into the chamber 1.

In the embodiment of the apparatus shown in FIG. 8, the connections of the chamber sections 13a, 13b and of the adapters 11a, 11b are preferably designed as plug-in connections with suitable sealing elements. The assembled parts are disposed within a preferably multi-edge profile housing 90 and are secured on this profile housing 90 by end plates 91 with openings 93.

The invention claimed is:

1. An apparatus for treatment of a stream of water, the apparatus comprising:
    a chamber (1) bounded by a wall and having an inlet opening (3) and an outlet opening (5) that define a main flow direction (P1) for water flowing in at the inlet opening (3) and flowing out at the outlet opening (5);
    at least one electrolysis device having two electrodes (15a, 15b) that are arranged spaced apart from one another in the chamber (1); and
    a vortexing device having at least one nozzle (45) for vortexing of the stream of water in the chamber (1) located in the chamber (1) between the inlet opening (3) and the outlet opening (5),
    wherein each said nozzle (45) comprises a cylindrical shell (51) on an inflow side thereof that bounds a vortex space, the cylindrical shell (51) is closed by an inflow cap (55) on the inflow side and has an exit opening (57) on an outflow side thereof, and the cylindrical shell (51) has at least one continuous inlet hole (53).

2. The apparatus as claimed in claim 1, wherein the vortexing device is arranged downstream between the electrodes (15a, 15b) and the outlet opening (5).

3. The apparatus as claimed in claim 2, wherein the at least one nozzle comprises multiple ones of the nozzles (45) located on a nozzle carrier (47), and the nozzle carrier (47) is installed into the chamber (1) such that the stream of water is divided into substreams that flow into the vortexing chambers through the inlet holes (53), and are combined again after exiting through the exit openings (57).

4. The apparatus as claimed in claim 1, further comprising a magnet arrangement including at least one magnet (61) disposed on the at least one nozzle (45) or on an outside of an outlet tube (9) that forms the outlet opening (5).

5. The apparatus as claimed in claim 4, wherein the at least one magnet comprises multiple magnets (61) that are in a peripheral arrangement with respect to the vortexing chamber in an outflow section of each said nozzle (45).

6. The apparatus as claimed in claim 1, wherein each said electrolysis device comprises a holder (17) that adjoins an inside of a wall of a corresponding chamber section (13*a*, 13*b*) of the chamber (1) and is joined to the wall, or which comprises a sealing element (74) for sealing of an insertion opening (71) in the wall, and the holder (17) holds the corresponding electrodes (15*a*, 15*b*) at a separation distance (L4) from one another such that the holder (17) and the electrodes (15*a*, 15*b*) form a boundary of the flow channel within the chamber section (13*a*, 13*b*).

7. The apparatus as claimed in claim 6, wherein the electrodes (15*a*) of a first said electrolysis device are made of fine silver and are disposed in a first one of the chamber sections (13*a*) and the electrodes (15*b*) of a further said electrolysis device are made of fine copper and are disposed in a further said chamber section (13*b*) or vice versa.

8. The apparatus as claimed in claim 6, wherein the at least two electrodes (15*a*) are made of different materials and are disposed in a first said chamber section (13*a*).

9. The apparatus as claimed in claim 1, wherein the electrodes (15*a*, 15*b*) of each said electrolysis device are electrically connected to a corresponding voltage source (39*a*, 39*b*), and said corresponding voltage source (39*a*, 39*b*) is configured to provide a voltage with a polarity alternating according to a defined pattern.

10. A method of treating a stream of water, the method comprising:
    passing the stream of water through a chamber (1) in a main flow direction (P1),
    locating at least two electrodes (15*a*, 15*b*) of an electrolysis device in said chamber (1),
    supplying the electrodes (15*a*, 15*b*) of said electrolysis device with a voltage having alternating polarity,
    releasing particles of the electrode material to the stream of water due to said voltage, and
    passing the water stream transversely to the main flow direction (P1) through at least one continuous inlet hole (53) in a cylindrical shell (51) of a nozzle (45) of a vortexing device in which the particles are mixed.

\* \* \* \* \*